US008745519B2

(12) United States Patent
Grotjohn

(10) Patent No.: US 8,745,519 B2
(45) Date of Patent: Jun. 3, 2014

(54) USER-CUSTOMIZABLE DIALOG BOX

(75) Inventor: D. Kirk Grotjohn, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1525 days.

(21) Appl. No.: 10/329,277

(22) Filed: Dec. 23, 2002

(65) Prior Publication Data

US 2004/0119739 A1      Jun. 24, 2004

(51) Int. Cl.
G06F 3/048      (2013.01)
(52) U.S. Cl.
USPC .......................................... 715/777; 715/778
(58) Field of Classification Search
USPC ......... 715/760, 777, 778, 780, 809; 707/3, 10
See application file for complete search history.

(56) References Cited

U.S. PATENT DOCUMENTS

| | | | | |
|---|---|---|---|---|
| 5,909,678 | A * | 6/1999 | Bergman et al. | 715/210 |
| 6,083,276 | A | 7/2000 | Davidson et al. | 717/1 |
| 6,268,852 | B1 | 7/2001 | Lindhorst et al. | 345/335 |
| 6,301,567 | B1 * | 10/2001 | Leong et al. | 705/33 |
| 6,429,880 | B2 | 8/2002 | Marcos et al. | 345/744 |
| 6,549,941 | B1 * | 4/2003 | Jaquith et al. | 709/219 |
| 6,785,671 | B1 * | 8/2004 | Bailey et al. | 705/26 |
| 2001/0052910 | A1 | 12/2001 | Parekh et al. | 345/744 |
| 2002/0016800 | A1 | 2/2002 | Spivak et al. | 707/523 |
| 2002/0103858 | A1 | 8/2002 | Bracewell et al. | 709/203 |
| 2002/0104070 | A1 | 8/2002 | Adams | 717/108 |
| 2002/0109730 | A1 | 8/2002 | Dardick | 345/809 |
| 2002/0111966 | A1 | 8/2002 | Fukuda et al. | 707/513 |
| 2002/0120506 | A1 * | 8/2002 | Hagen | 705/14 |

OTHER PUBLICATIONS

"Yahoo", Screen Captures Figures 1-7, Yahoo Advanced Search features have been available since (or before) 2000.*
Yahoo for Dummies by Brad Hill, pp. 79, 242, and 243, published 1999.*
Yahoo Search Page, Dec. 28, 1996, figures 1-4.*
Google Search Page, Dec. 3, 2000, figures 1-4.*
Google Search Page, Dec. 17, 2001, figures 1-2.*
*Creating Tag Definitions*, Allaire Corporation, (1998).
*Using the Tag Tree and Tad Inspector*, Allaire Corporation, (2000).
L. Chalnick, *Creating Your Own Tags With Cold Fusion, New Architect*, (1996-2002).
*Start: HomeSite 1.2, Web Design Center*, <http://www.nv.cc.va.us/home/ataomina/wcd/HomeSite1/start2.htm>, (Sep. 1999).

(Continued)

*Primary Examiner* — Weilun Lo
*Assistant Examiner* — Truc Chuong
(74) *Attorney, Agent, or Firm* — Steven M. Greenberg, Esq.; CRGO Law

(57) ABSTRACT

A customizable dialog box. The customizable dialog box can include a primary display region and at least one secondary display region activatable from the primary display region. One or more user input fields can be disposed in the at least one secondary display region. Similarly, one or more selection controls can be disposed in the at least one secondary display region. In that regard, each one of the selection controls can correspond to one of the user input fields. Finally, at least one primary user input field can be disposed in the primary display region. Specifically, the at least one primary user input field can include a user input field in the secondary display region whose corresponding selection control has been activated.

16 Claims, 3 Drawing Sheets

(56) References Cited

OTHER PUBLICATIONS

J. Kohl, *HomeSite 4.0l,* http://goinside.com/99/3/hrs.html>(1999).
*Agile HTML Editor,* http://www.agilie.com/editor_features.htm>.
Edit HTML and JSP files (using Page Designer) <www-3ibm-com/software/webservers/studio/doc/V352/studioguide/en/html/sdswpage.html>.
*New Features in Multi-Edit 9,* ME Software, Inc.
*9.2.2. Using Static HTML Pages,* AdventNet, Inc., http://www.adventnet.com/products/javaagentbeta/help/jmx/j_html_staticpg.html>(2002).
*Customizing SiteSurfer Applet Tags,* <http://www.devtech.com/SiteSurfer/doc/help/apptags.htm>.
R. Dobson, Jump Starting Your Site with Dynamic HTML, *New Architect,* (2002).

\* cited by examiner

USER-CUSTOMIZABLE DIALOG BOX

BACKGROUND OF THE INVENTION

1. Statement of the Technical Field

The present invention relates to the graphical user interface (GUI) arts and more particularly to customizable dialog boxes for use in a GUI environment.

2. Description of the Related Art

The conventional graphical user interface (GUI) has been widely used for many years. The primary function of the GUI includes providing user interface controls with which the end-user can interact with an underlying application. The common GUI includes many stock user interface controls, most of which, when combined, can accommodate most computer-human interactions required by an application. For example, the static text box control can be used to present text to the end-user while an edit box can permit the user to provide textual input to the application. A radio button control can provide for the exclusive selection of an element from among a field of elements, while a checklist box can control can provide for the non-exclusive selection of elements from among a field of elements.

The dialog box represents one of the staple window types in the conventional GUI. The conventional dialog box often is used to present a menu of all possible configurable options for a given object. The dialog box typically incorporates one or more controls and user input fields such as radio buttons, check boxes, drop down boxes, and edit boxes, in addition to static text fields describing the purpose of each user input field. Importantly, the dialog box further can include a close control which when activated signals the application that the user input fields have been completed with data which can be processed now that the dialog has completed. Ordinarily, this button will be labeled with lexically apropos language such as "Close", "OK", "Complete", "Next" and the like. Thus, the dialog box represents a window in which a two-way dialog can be conducted between end user and application, which can be concluded through the selection of a control established for the purpose of concluding the dialog.

Often times, a two-way dialog between end user and application can become complex, involving multiple user input fields, many of which may not be relevant for a given end user. In this regard, the inclusion of too many user input fields on a single dialog box can become visually unwieldy. Consequently, complex dialog boxes can include a basic display of only the primary user input fields (as determined by the developer of the GUI) of the two-way dialog. The basic display can include a control such as a button (typically labeled "Advanced" or "Show All") which when activated, can cause the display, either in an expanded view of the dialog, or in a secondary dialog, of both the user input fields of the basic display in addition to the remaining user input fields not included in the basic display. As an alternative, the dialog can be a tabbed notebook dialog known in the art, in which the primary default tab includes common user input fields, while subsequent tabs include the secondary user input fields.

Both of the foregoing conventional approaches to constructing GUI dialogs have limitations. The most obvious limitation is that the conventional dialog box does not allow individual customization. In this regard, where a user often completes a user input field not ordinarily included in the basic display, but in the secondary display, the user must always activate the advanced display. As a result, though the user merely wanted to complete the single input field, the user will be compelled to navigate all of the remaining user input fields in the secondary display.

Not only will the user be required to undertake extra process steps to show the advanced portion of the dialog, but the secondary display usually can be difficult to navigate as the desired field can be difficult to locate among the remaining fields and may not have associated therewith a descriptive label. By comparison, in the tabbed notebook, if the user frequently uses several extra input fields not included in the basic tab, and the input fields happen to be within several different notebook tabs, the user may have to go complete several extra tabs simply to access the one desired input field.

SUMMARY OF THE INVENTION

The present invention is a user customizable dialog box for use in a GUI which overcomes the inherent deficiencies known to be associated with the conventional complex dialog box. A customizable dialog box article of manufacture which has been configured in accordance with the inventive arrangements can include a primary display region and at least one secondary display region activatable from the primary display region. One or more user input fields can be disposed in the at least one secondary display region. Similarly, one or more selection controls can be disposed in the at least one secondary display region. In that regard, each one of the selection controls can correspond to one of the user input fields. Finally, at least one primary user input field can be disposed in the primary display region. Specifically, the at least one primary user input field can include a user input field in the secondary display region whose corresponding selection control has been activated.

In one aspect of the present invention, each of the primary display region and the at least one secondary display region can be displayed within a separate dialog box. In contrast, in another preferred aspect of the present invention, each of the primary display region and the at least one secondary display region can be displayed within a separate notebook tab in a single dialog box. Finally, one or more configuration controls can be disposed in the at least one secondary display region. Each one of the configuration controls can correspond to one of the user input fields. To that end, one or more separately activatable configuration dialog boxes can be provided. Each one of the separately activatable configuration dialog boxes can correspond to one of the user input fields in the at least one secondary display region. Moreover, each one of the separately activatable configuration dialog boxes can include one or more controls configured to change display options associated with the corresponding one of the user input fields.

A method for customizing the user input fields displayed in a primary display region of a dialog box can include receiving a request to display the dialog box. Responsive to the request, a list of user input fields to be displayed in at least one secondary display region can be loaded. Individual ones of the user input fields can be identified which have been selected for display in the primary display region as well as the at least one secondary display region. The identified user input fields can be positioned in the primary display region, and all of the user input fields can be positioned in the at least one secondary display region. Finally, the dialog box can be rendered.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a customizable dialog box for use in a GUI. In accordance with the inventive arrangements, a customizable dialog box can include both a primary display region and one or more secondary display regions. Of the multiplicity of user input controls which can be included in the customizable dialog box, on selected ones of the user input controls can be included in the primary display region of the customizable display region. The remaining user input fields in addition to the selected user input controls can be displayed in the secondary display regions. Notably, a selection control can be included with each of the user input fields displayed in the secondary display region. In this way, an end-user can select which input fields are to be displayed in the primary display region.

Figure 1:
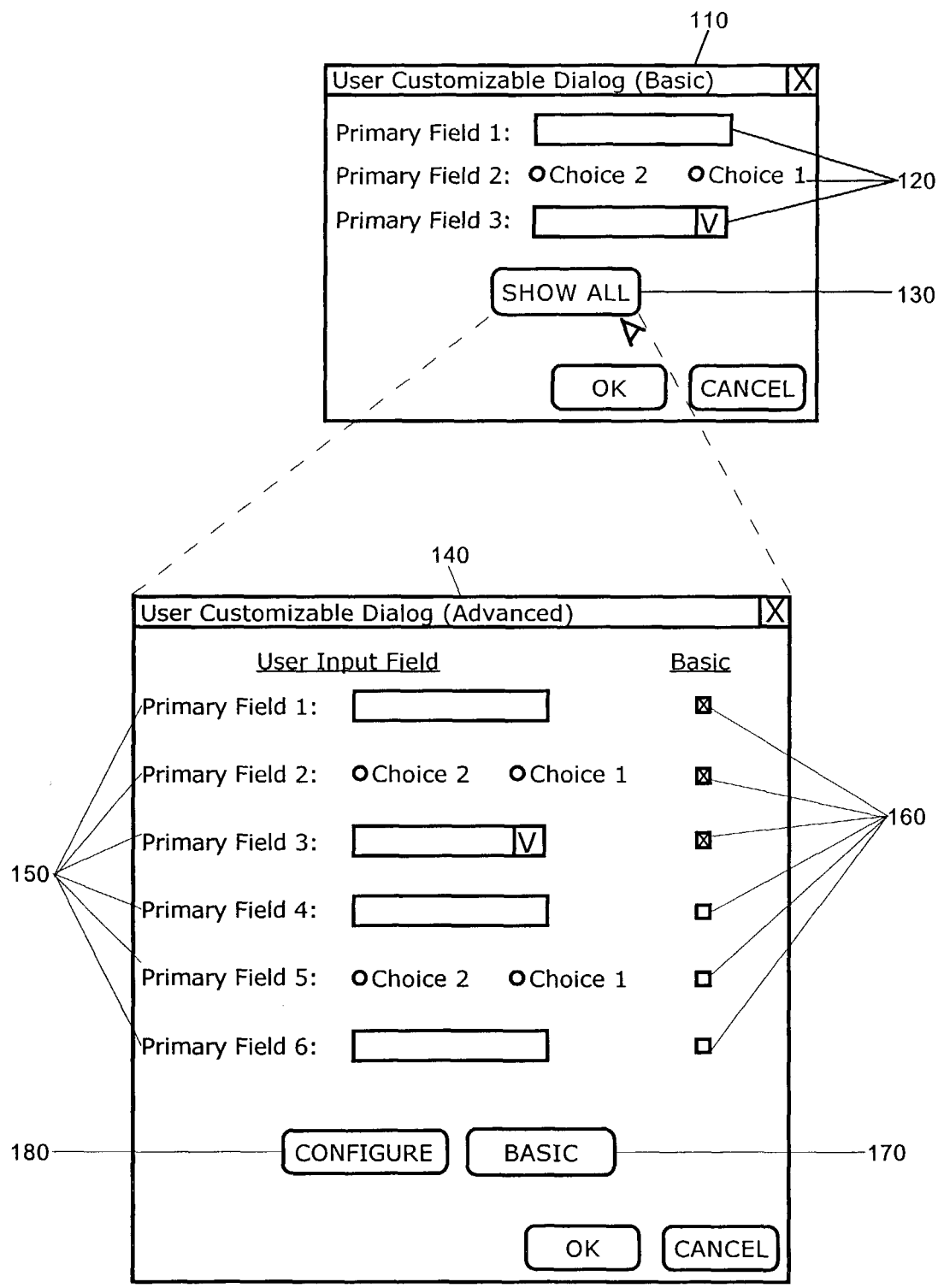
FIG. 1 is a pictorial illustration of a customizable dialog box having both primary and secondary displays.

FIG. 1 is a pictorial illustration of an exemplary customizable dialog box having both primary and secondary displays. The exemplary customizable dialog box of FIG. 1 can include both a primary display region 110 and a secondary display region 140. In the primary region, a selection of user input controls 120 can be displayed. The user input controls 120 can include, but are not necessarily limited to edit boxes, radio button fields, drop down boxes, and the like. Presumably, the user input controls 120 selected for display in the primary display region 140 will include those controls most utilized by an end user engaging in a two-way dialog with an underlying application.

To access the remaining user input controls not shown in the primary display region 110, a "Show All" button 130 can be disposed in the primary display region 110. Upon activation, the secondary display region 140 can be rendered as the active window. The secondary display region 140 not only can include a listing of the user input controls 120 of the primary display region 110, but the secondary display region 140 can include all of the user input controls 150 associated with the customizable dialog box of the present invention.

Importantly, a selection of corresponding check boxes 160 can be associated with each of the user input controls 150 in the secondary display region 140. By selecting one of the check boxes 160, a corresponding one of the user input controls 150 will be subsequently displayed within the primary display region 110 as it will be apparent to one skilled in the art. In this way, the end user can maintain control over the inclusion of particular user input controls 150 in the primary display region 110 such as those of user input controls 150 most often used by the end user. In any case, to reactivate the display of the primary display region 110, a "Basic" button 170 can be disposed within the secondary display region 140.

Finally, a "Configure" button 180 can be included in the secondary display region 140. Upon activation, the Configure button 180 can invoke one or more additional display regions (not shown) in which the selected one of the user input controls 150 can be further customized. As an example, the static text label associated with the user input control can be renamed for the sake of simplicity or clarity. Also, the type of user input control can be changed, for instance from edit box to drop-down box. Other well-known display options are contemplated to be within the scope of the invention as well. Examples can include determining formatting options for values provided in the user input control, or whether the completion of the control is mandatory.

Figure 2:
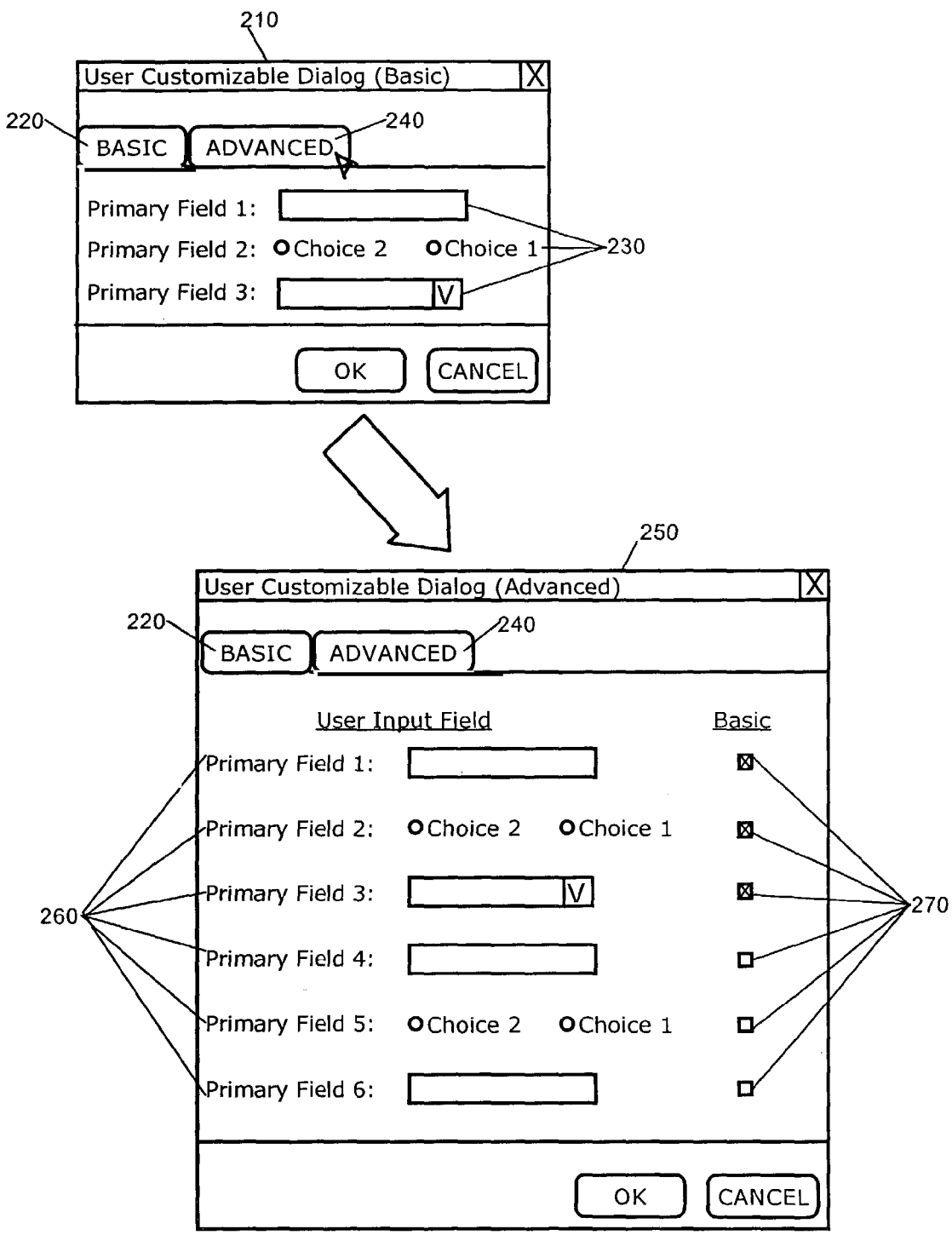
FIG. 2 is a pictorial illustration of a customizable dialog box having primary and secondary notebook tabs; and, FIG. 3 is a flow chart illustrating a process for rendering a customizable dialog box in a GUI in accordance with the inventive arrangements.

FIG. 2 is a pictorial illustration of an exemplary customizable dialog box having primary and secondary notebook tabs. The customizable dialog box shown in FIG. 2 can have both a basic tab 220 and an advanced tab 240 in the primary display region 210. By default, the basic tab 220 can be activated upon activation of the customizable dialog box. The primary display region 210 can include those user input fields 230 selected for display by the user in the primary display region 210. To view all user input fields 260, the user need only view the secondary display region 250 which can be accessed by activating the advanced tab 240. Still, it will be important for the skilled artisan to recognize that the invention is not limited only to a single advanced tab 240. Rather, in an alternative aspect of the invention, it is contemplated that multiple layers of advanced tabs can be included to accommodate multiple controls in the customizable dialog box.

As in the case of the customizable dialog box of FIG. 1, in FIG. 2 each of the user input fields 260 can have a corresponding check box 270. By selecting one or more of the check boxes 270, the corresponding one of the user input fields 260 will be included in the primary display region 210 under the basic tab 220. Notably, though not shown in FIG. 2, as in the customizable dialog box of FIG. 1, each one of the user input fields 260 can be further configured with various display options such as value formatting, static text labeling, control type and the like.

Significantly, as it will be recognized by one skilled in the art, the invention is not to be limited strictly to the two embodiments illustrated in FIGS. 1 and 2. Rather, the skilled artisan will recognize that all customizable dialog boxes having a primary and one or more secondary display regions are contemplated to be within the scope of the present invention so long as the user input fields included in the primary display region can be selected within the one or more secondary display regions. Also, it is to be noted that other user input fields can be included in the primary display region notwithstanding the user selection or de-selection of the same. That is to say, some user input fields can be permanently included in the primary display region by default.

Figure 3:
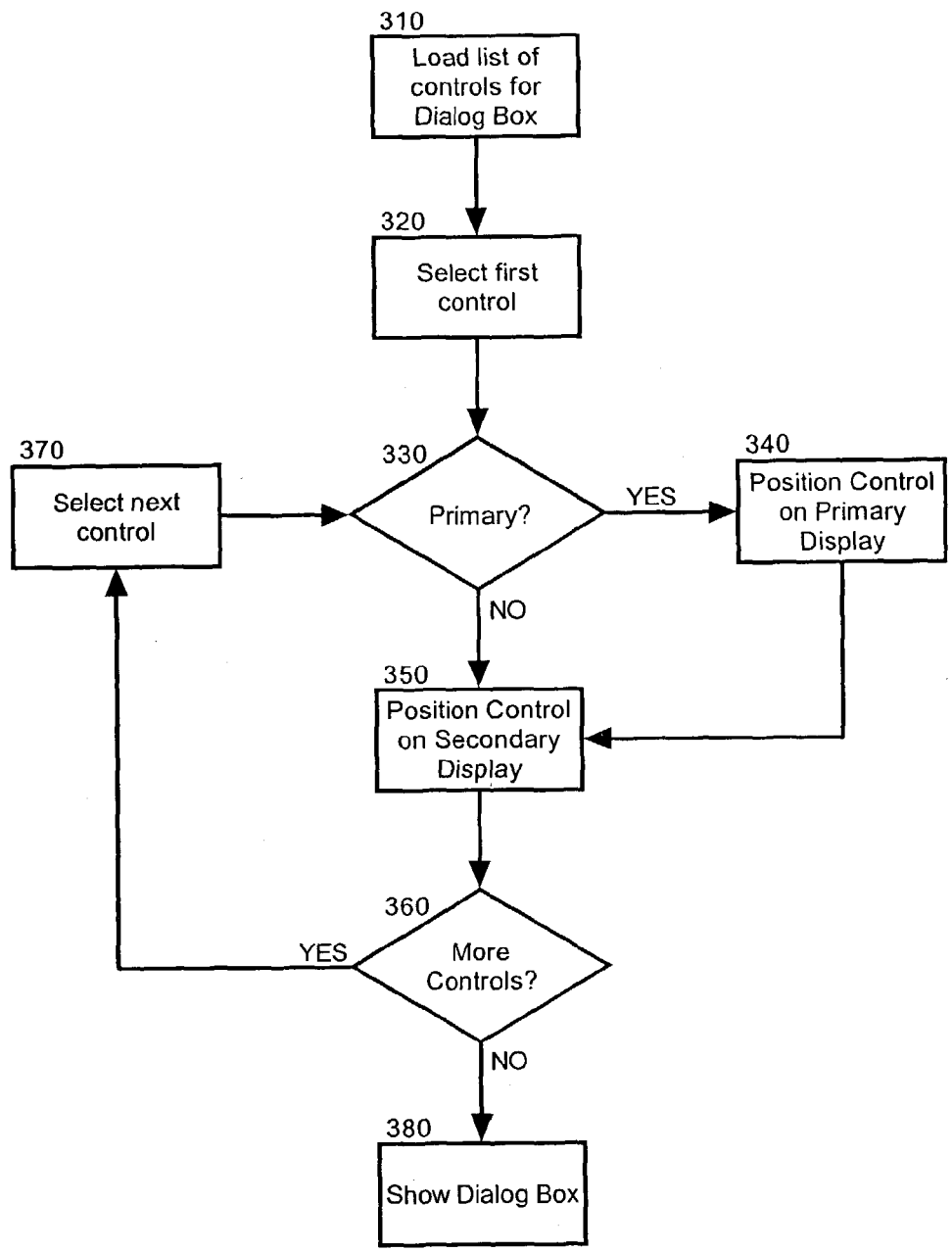

FIG. 3 is a flow chart illustrating a process for rendering a customizable dialog box in a GUI in accordance with the inventive arrangements. Upon activation of the customizable dialog box in the GUI, beginning in block 310, a list of user input fields and their respective controls to be included in the customizable dialog box can be loaded. In block 320, the first of the loaded controls can be selected. In decision block 330, if the control has an attribute indicating that the control should be included in a primary display region of the customizable dialog box, in block 340 the control can be positioned in the primary display region of the customizable dialog box. Also, in block 350 the control can be positioned in the secondary display region of the customizable dialog box.

In decision block 330, however, if the attribute does not indicated that the control should be included in the primary display region of the customizable dialog box, in block 350, the control can be positioned in the secondary display region of the customizable dialog box, but not in the primary display region of the customizable dialog box. In any case, in decision block 360, if more controls remain to be analyzed, in block 370 the next control can be selected for analysis and the process can repeat through blocks 330 through 360. When finished, in block 380 the customizable dialog box can be rendered in the GUI.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A customizable dialog box article of manufacture, comprising:
   a primary display region and at least one secondary display region activatable from said primary display region;
   a plurality of user input fields disposed in said at least one secondary display region;
   a plurality of selection controls disposed in said at least one secondary display region, each one of said selection controls corresponding to one of said user input fields; and,
   at least one primary user input field disposed in said primary display region, said at least one primary user input field comprising a user input field in said secondary display region whose corresponding selection control has been activated.

2. The customizable dialog box of claim 1, wherein each of said primary display region and said at least one secondary display region are displayed within a separate dialog box.

3. The customizable dialog box of claim 1, wherein each of said primary display region and said at least one secondary display region are displayed within a separate notebook tab in a single dialog box.

4. The customizable dialog box of claim 1, further comprising:
   a plurality of configuration controls disposed in said at least one secondary display region, each one of said configuration controls corresponding to one of said user input fields; and,
   a plurality of separately activatable configuration dialog boxes, each one of said separately activatable configuration dialog boxes corresponding to one of said user input fields in said at least one secondary display region, each one of said separately activatable configuration dialog boxes comprising a plurality of controls configured to change display options associated with said corresponding one of said user input fields.

5. A method for customizing the user input fields displayed in a primary display region of a dialog box, comprising:
   receiving a request to configure the primary display region of the dialog box;
   responsive to said request, loading a list of user input fields to be displayed in at least one secondary display region;
   displaying the loaded list of user input fields in the at least one secondary display region;
   receiving, using said at least one secondary display region, a selection of individual ones of said user input fields for display in the primary display region;
   and
   rendering the primary display region of the dialog box, wherein
   the rendered primary display region includes, from said loaded list of user input fields to be displayed in said at least one secondary display region, only the selected individual ones of said user input fields.

6. The method of claim 5, further comprising
   positioning, within said at least one secondary display region, a plurality of selection controls;
   logically coupling each one of said selection controls to a corresponding one of said user input fields; and
   responsive to an activation of one of said selection controls, modifying a list of user input fields to be rendered in said primary display region to include the activated one of said selection controls.

7. The method of claim 6, further comprising
   responsive to a de-activation of one of said selection controls, modifying said list of user input fields to be rendered in said primary display region to remove the deactivated one of said selection controls.

8. The method of claim 5, further comprising
   positioning, within said at least one secondary display region, a plurality of configuration controls;
   logically coupling each one of said configuration controls to a corresponding one of said user input fields;
   responsive to an activation of one of said configuration controls, rendering a corresponding configuration dialog box comprising a plurality of controls configured to change display options associated with said corresponding one of said user input fields; and
   upon closing said rendered configuration dialog box, re-rendering the dialog box with said corresponding one of said user input fields reflecting said changed display options.

9. The method of claim 5, wherein
   the primary display region and said at least one secondary display region are rendered in separate dialog boxes.

10. The method of claim 5, wherein
    the primary display region and said at least one secondary display region are rendered in separate notebook tabs in the dialog box.

11. A machine readable storage having stored thereon a computer program for customizing the user input fields displayed in a primary display region of a dialog box, the computer program comprising a routine set of instructions for causing the machine to perform the steps of:
    receiving a request to configure the primary display region of the dialog box;
    responsive to said request, loading a list of user input fields to be displayed in at least one secondary display region;
    displaying the loaded list of user input fields in the at least one secondary display region;

receiving, using said at least one secondary display region, a selection of individual ones of said user input fields for display in the primary display region; and rendering the primary display region of the dialog box, wherein the rendered primary display region includes, from said loaded list of user input fields to be displayed in said at least one secondary display region, only the selected individual ones of said user input fields.

12. The machine readable storage of claim 11, further comprising positioning, within said at least one secondary display region, a plurality of selection controls;

logically coupling each one of said selection controls to a corresponding one of said user input fields; and responsive to an activation of one of said selection controls, modifying a list of user input fields to be rendered in said primary display region to include the activated one of said selection controls.

13. The machine readable storage of claim 12, further comprising responsive to a de-activation of one of said selection controls, modifying said list of user input fields to be rendered in said primary display region to remove the deactivated one of said selection controls.

14. The machine readable storage of claim 11, further comprising the steps of;

positioning, within said at least one secondary display region, a plurality of configuration controls;

logically coupling each one of said configuration controls to a corresponding one of said user input fields;

responsive to an activation of one of said configuration controls, rendering a corresponding configuration dialog box comprising a plurality of controls configured to change display options associated with said corresponding one of said user input fields; and upon closing said rendered configuration dialog box, re-rendering the dialog box with said corresponding one of said user input fields reflecting said changed display options.

15. The machine readable storage of claim 11, wherein the primary display region and said at least one secondary display region are rendered in separate dialog boxes.

16. The machine readable storage of claim 11, wherein the primary display region and said at least one secondary display region are rendered in separate notebook tabs in the dialog box.

* * * * *